United States Patent [19]

Osder

[11] Patent Number: 5,678,786
[45] Date of Patent: Oct. 21, 1997

[54] RECONFIGURABLE HELICOPTER FLIGHT CONTROL SYSTEM

[75] Inventor: Stephen S. Osder, Scottsdale, Ariz.

[73] Assignee: McDonnell Douglas Helicopter Co., Mesa, Ariz.

[21] Appl. No.: 567,898

[22] Filed: Dec. 6, 1995

[51] Int. Cl.$^6$ .................. B64C 11/44; B64C 27/605; G05D 1/10; F03B 3/14

[52] U.S. Cl. .................. 244/17.13; 244/17.25; 244/177; 244/195; 416/114

[58] Field of Search .................. 244/17.23, 17.25, 244/17.13, 177, 185, 194, 195; 416/35, 36, 114

[56] References Cited

U.S. PATENT DOCUMENTS

| | | | |
|---|---|---|---|
| 3,679,156 | 7/1972 | Redmond, Jr. | 244/75 R |
| 4,243,358 | 1/1981 | Carlock et al. | 416/114 |
| 4,274,808 | 6/1981 | Garner et al. | 416/114 |
| 4,362,085 | 12/1982 | Venuti, Jr. | 416/114 |
| 4,460,964 | 7/1984 | Skutecki et al. | 244/17.13 |
| 4,528,628 | 7/1985 | Fischer et al. | 244/17.13 |
| 4,601,169 | 7/1986 | Hesse et al. | 60/406 |
| 4,899,641 | 2/1990 | Khan | 416/114 |
| 4,930,988 | 6/1990 | Griffith | 416/114 |
| 5,001,646 | 3/1991 | Caldwell et al. | 364/434 |
| 5,012,423 | 4/1991 | Osder | 364/432 |
| 5,141,177 | 8/1992 | Wright et al. | 244/17.13 |

Primary Examiner—Andres Kashnikow
Assistant Examiner—Virna Lissi Mojica
Attorney, Agent, or Firm—Donald E. Stout

[57] ABSTRACT

A failure of any one of three swashplate actuators of a helicopter rotor blade is detected. Once such a detection is made, the position of this nonfunctional swashplate is locked and measured. The inputted commanded swashplate collective position, commanded swashplate x-axis rotational position, and commanded swashplate y-axis rotational position are then passed to a failure-mode control matrix. The failure-mode control matrix computes swashplate actuator commanded positions for the two operable swashplate actuators so that aircraft attitude control is maintained. These two swashplate actuator commanded positions instruct positional movement of the rotor blade swashplate to thereby meet the commanded swashplate x-axis rotational position and the commanded swashplate y-axis rotational position which will control attitude. A quasi-swashplate-collective-position corrector computes the quasi-swashplate collective position that will occur because of the successful control of the aircraft's attitude. The swashplate-collective-position corrector then generates an amount of rotor blade lift attainable with a computed rotor blade speed change to compensate for any difference between the commanded swashplate collective position and the quasi-swashplate collective position. A closed loop vertical velocity controller refines the predicted rotor speed change that is commanded to correct for the loss of collective control.

34 Claims, 4 Drawing Sheets

RECONFIGURABLE HELICOPTER FLIGHT CONTROL SYSTEM

BACKGROUND OF THE INVENTION

The present invention relates generally to helicopters and, more particularly, to a helicopter flight control system which can be reconfigured in the event of partial failure.

A fly-by-wire helicopter flight control system provides advances in control precision and aircraft flying qualities over the conventionally controlled helicopter where the pilot must manipulate lateral and longitudinal cyclic controls, pedal controls, and collective control to stabilize and maneuver the aircraft. In a properly designed fly-by-wire flight control system, stabilization of the aircraft is inherently provided by attitude, attitude rate, velocity, and even position feedbacks, and sidestick control devices act as joy sticks which allow the pilot to command these motions directly. For example, the pilot may deflect the sidestick device laterally, and thereby command a roll rate, and the aircraft will automatically hold the roll attitude that is attained when the sidestick is released. Rather than the pilot adding combinations of cyclic control, pedal, and collective commands and "fighting" the helicopter's inherently poor stability and cross-axis coupling in the cyclic, collective, and pedal controls, the fly-by-wire system's computers determine the precise amount of control manipulation needed in all four control axes in order to achieve the commanded maneuver. Fly-by-wire flight control systems therefore offer decoupled control where the pilot need only issue stick commands in the desired maneuvering axis, while the control computers determine how to command the necessary forces and moments on the aircraft. U.S. Pat. No. 5,001,646, issued to Caldwell et al., describes fly-by-wire flight control mechanizations which provide such decoupled control, as well as precise flight path stabilization.

The state-of-the-art in fly-by-wire flight control systems contains many concepts for applying redundancy to the flight control computers, motion sensors, and control actuators, so that the resulting systems are highly fault tolerant and can continue operating without degradation following multiple component failures. Despite the above-cited advantages to fly-by-wire flight control for helicopters, there is often a reluctance to commit to such a system because of the possibility of a particular failure, which, if it occurs, can cause a rapid and catastrophic upset of the aircraft. That failure involves the loss of positioning capability at any one point on the swashplate. While actuators and related computers will typically include sufficient redundancy to preclude random failures from leading to such a catastrophic situation, that redundancy cannot be expected to cope with unusual events such as structural damage due to a variety of causes ranging from severe engine separation to terrorist bombs and battle damage in military helicopters. This invention involves a method for reconfiguring the controls following such a "catastrophic" loss of positioning capability of the swashplate, thereby allowing safe recovery of the fly-by-wire helicopter following this event.

FIG. 1 shows a top planar view of a rotor blade swashplate having three swashplate actuators attached thereto. The rotor blade swashplate has a triangle 11 etched thereon. The first swashplate actuator 13 is attached to a first corner of the triangle 11, the second swashplate actuator 15 is attached to a second corner of the triangle 11, and a third swashplate actuator 17 is attached to a third corner of the triangle 11. The first, second, and third swashplate actuators 13, 15 and 17 are subsequently represented in schematic and mathematical form as A, B, and C, respectively.

At a minimum, the first swashplate actuator 13, the second swashplate actuator 15, and the third swashplate actuator 17 must be located at the three vertices of the triangle 11, which is inscribed on the swashplate. In order to define the desired combination of cyclic and collective control, these three swashplate actuators 13, 15 and 17, must be independently controlled. Although more swashplate actuators may be used, these three swashplate actuators 13, 15, and 17 are sufficient to provide the basis for main rotor blade control in a conventional single rotor blade helicopter configuration.

The three swashplate actuators 13, 15, 17 may be controlled by mechanical control linkages from the pilot stick, such as in the conventional UH-60; or the three swashplate actuators 13, 15, 17 may be controlled by computers, as is the case with the RH-66 fly-by-wire helicopter flight controls. In the Apache helicopter configuration, three swashplate actuators drive a mechanical mixer, and the output of the mechanical mixer connects to the vertices of the triangle 11 at the stationary swashplate. Regardless of the specific rotor blade swashplate and swashplate actuator configuration, loss of control over any one of the commanded positions of any of the three vertices A, B, C of the triangle 11 is catastrophic to the aircraft, leading to a rapid upset in attitude which causes the aircraft to fall out of the sky while undergoing the equivalent of spinning.

Even fixed-wing aircraft are not immune to the problem of inoperability of one or more of the various flight control surfaces. Research on solutions for controlling fixed-wing aircraft in the presence of multiple failures, sponsored by the United States Air Force, has been somewhat successful. These research efforts have been directed to devising self-repairing and reconfigurable techniques which help to prevent catastrophic loss of aircraft control following destructive events. One reason for the relative success in the fixed-wing aircraft arena stems from the variety of redundant force and moment producing surfaces of a typical fixed-wing aircraft. This large number of redundant force and moment producing surfaces can be arranged in many different ways to compensate for the total loss of a single control surface, for example.

Even differential engine thrust has been shown in the context of fixed-wing aircraft to be effective in generating yawing moments and pitching moments, when all horizontal and vertical tail controls were lost. Although the performance of the fixed-wing aircraft is compromised, the degraded performance resulting from the failure reconfiguration of the yawing moments and pitching moments is acceptable, since the failure reconfiguration allows for a relatively safe return to landing.

Unlike fixed-wing aircraft, helicopters are not endowed with alternative pitch and roll moment producing surfaces, other than the rotor blade flapping, achieved by positioning the rotor blade swashplate. The prior art has thus been unable to find any natural reconfiguration devices in the basic design of a helicopter. In the 1980's, Bell Helicopter implemented a helicopter swashplate having five or six swashplate actuators distributed around the swashplate in a pentagon or hexagon configuration. The five or six actuators worked together to perform the functions of the first swashplate actuator 13, the second swashplate actuator 15, and the third swashplate actuator 17 of FIG. 1.

The precision with which these five or six points on the rotor blade swashplate had to be controlled was very high and, accordingly, errors routinely surfaced from normal tolerance build up, resulting in severe force fights between the five or six actuators. To combat these force fights, Bell Helicopters working in conjunction with Draper Laboratories on equalization schemes, but various instabilities in the overall system remained.

Since it is the control computers in fly-by-wire helicopter flight control systems that actually issue the swashplate actuator positioning commands, the prior art has endeavored to make these control computers as reliable as possible. Many prior art systems incorporate electronic backup systems for providing survivability when the control computers of a double fail-operative system no longer function. U.S. Pat. No. 5,012,423 to Osder titled "Back-Up Fly-by-Wire Control System" discloses such an electronic backup system for providing survivability when the control computers and related motion sensors are down. This prior art system, however, only works to ensure reliability of the control computers and related sensors, and thus does not address failure of any one of the swashplate actuators themselves.

The prior art has been unable to resolve the problem of reconfiguring the rotor blade swashplate control upon a partial failure in a three swashplate actuator fly-by-wire helicopter control system. A solution to this problem could save human lives, especially since the three swashplate actuator configuration, as opposed to five and six swashplate configurations, is popular in helicopter design.

SUMMARY OF THE INVENTION

The reconfigurable helicopter flight control system of the present invention provides a means for avoiding catastrophe when a three swashplate actuator fly-by-wire helicopter control system experiences a partial failure. The reconfigurable helicopter flight control system is applicable to any fly-by-wire helicopter flight control system, including fly-by-wire helicopter flight control systems which use very high levels of redundancy in each of the three actuator mechanizations.

The reconfigurable helicopter flight control system of the present invention monitors the swashplate actuators in order to rapidly detect a non-functional state of any one of the swashplate actuators. Upon detection of a non-functional swashplate actuator, that actuator is locked into its failed position, and the failed position of the non-functional swashplate actuator is measured for the reconfiguration process.

The swashplate actuator positions of the remaining functional swashplate actuators are then changed in order to compensate for the failed swashplate actuator. With this reconfiguration, the pitch and roll of the helicopter may be controlled to provide for safe landing.

Although attitude stabilization of the helicopter is achieved, vertical velocity of the aircraft is initially sacrificed. This loss of precise vertical velocity control results from the attitude stabilization maintained by moving only the two swashplate actuators. Vertical velocity control is therefore achieved by increasing and decreasing the speed of the rotor blade. Thus, an object of the present invention is to sacrifice the precision and range of vertical velocity control for rapid aircraft attitude stabilization, and to maintain the vertical velocity through changes in the rotor blade speed.

The reconfigurable helicopter flight control system of the present invention inputs a commanded swashplate collective position, a commanded swashplate x-axis rotational position, and a commanded swashplate y-axis rotational position. The commanded swashplate collective position represents a desired vertical displacement of the rotor blade swashplate, and represents an amount of lift which is to be generated by the rotor blade. The commanded swashplate x-axis rotational position represents a desired positioning of the rotor blade swashplate about the x-axis, and the commanded swashplate y-axis rotational position represent a desired movement of the rotor blade swashplate about the y-axis.

The reconfigurable helicopter flight control system further includes a determiner for determining whether the first swashplate actuator, the second swashplate actuator, or the third swashplate actuator has failed. A normal control matrix receives the commanded swashplate collective position, the commanded swashplate x-axis rotational position, and the commanded swashplate y-axis rotational position. When none of the three swashplate actuators have failed, the normal control matrix outputs a first swashplate actuator commanded position, a second swashplate actuator commanded position, and a third swashplate actuator commanded position.

Upon a determination that the first swashplate actuator has failed, a first-swashplate-actuator-failure control matrix receives the commanded swashplate collective position, the commanded swashplate x-axis rotational position, and the commanded swashplate y-axis rotational position. Instead of outputting first, second, and third swashplate actuator commanded positions, the first-swashplate-actuator-failure control matrix outputs a second swashplate actuator commanded position, a third swashplate actuator commanded position, and a quasi-swashplate collective position. The quasi-swashplate collective position represents an approximation of the commanded swashplate collective position, but it is recognized that this commanded swashplate position is probably unattainable.

Upon a determination that the second swashplate actuator has failed, a second-swashplate-actuator-failure control matrix generates and outputs a first swashplate actuator commanded position, a third swashplate actuator commanded position, and a quasi-swashplate collective position, after receiving the commanded swashplate collective position, the commanded swashplate x-axis rotational position, and the commanded swashplate y-axis rotational position.

Upon a determination that the third swashplate actuator has failed, a third-swashplate-actuator-failure control matrix, after receiving the commanded swashplate collective position, the commanded swashplate x-axis rotational position, and the commanded swashplate y-axis rotational position, outputs a first swashplate actuator commanded position, a second swashplate actuator commanded position, and a quasi-swashplate collective position.

Thus, either the normal control matrix, the first-swashplate-actuator-failure control matrix, the second-swashplate-actuator-failure control matrix, or the third-swashplate-actuator-failure control matrix generates swashplate actuator commanded positions and/or quasi-swashplate collective positions in the event of a swashplate actuator failure. These swashplate actuator commanded positions and/or quasi-swashplate collective positions are processed by a normal-mode receiver when none of the three swashplate actuators has failed, and by a failure-mode receiver when a detected failure of one of the swashplate actuators has occurred.

When none of the three swashplate actuators has failed, the normal mode receiver basically receives the first, second, and third swashplate actuator commanded positions and passes them to a swashplate actuator interface. The failure mode receiver, on the other hand, operates to pass the two swashplate actuator commanded positions from whichever swashplate-actuator-failure control matrix, which is currently operating, to the swashplate actuator interface.

The failure mode receiver passes the quasi-swashplate collective position from that same swashplate-actuator-failure control matrix to a swashplate-collective-position corrector. The swashplate-collective-position corrector commands an amount of rotor blade torque to compensate for the difference in rotor blade lift between the commanded swashplate collective position and the quasi-swashplate collective position.

When the first actuator has failed, the failure mode receiver receives the second swashplate actuator commanded position and the third swashplate actuator commanded position from the first-swashplate-actuator-failure control matrix. When the second actuator has failed, the failure mode receiver receives the first swashplate actuator commanded position and the third swashplate actuator commanded position from the second-swashplate-actuator-failure control matrix. When the third swashplate actuator has failed, the failure mode receiver receives the first swashplate actuator commanded position and the second swashplate actuator commanded position from the third-swashplate-actuator-failure control matrix.

The swashplate-collective-position corrector includes a swashplate-collective-position difference determiner, which inputs both the commanded swashplate collective position and the quasi-swashplate collective position. The swashplate-collective-position difference determiner finds a difference between the commanded swashplate collective position and the quasi-swashplate collective position, and outputs this difference to a rotor-blade-speed determiner, which generates a change in rotor blade speed corresponding to the difference between the commanded swashplate collective position and the quasi-swashplate collective position.

According to another aspect of the present invention, the swashplate-collective-position corrector further includes an aircraft-vertical-velocity controller. The aircraft-vertical-velocity controller inputs a commanded aircraft vertical velocity and a measured aircraft vertical velocity. The aircraft-vertical-velocity controller generates a rotor blade speed correction, which corresponds to a difference between the commanded aircraft vertical velocity and the measured aircraft vertical velocity.

The aircraft-vertical-velocity controller includes an aircraft-vertical-velocity difference determiner, which receives the two inputs of the aircraft-vertical-velocity controller and outputs an aircraft vertical velocity difference. The aircraft-vertical-velocity controller also includes an aircraft-vertical-velocity-to-rotor-blade-speed converter, which receives the output from the aircraft-vertical-velocity difference determiner and converts this output into the rotor blade speed correction.

The swashplate-collective-position difference determiner further includes a rotor-blade-speed-command generator for finding a difference between the change in rotor blade speed from the rotor-blade-speed determiner and a reference rotor blade speed. The rotor-blade-speed-command generator also sums the rotor blade speed correction, which was output from the aircraft-vertical-velocity-to-rotor-blade-speed converter. After summing the change in rotor blade speed, the reference rotor blade speed, and the rotor blade speed correction, the rotor-blade-speed-command generator outputs a rotor blade speed command. The rotor blade speed command then is passed to an engine speed controller for generating a corresponding rotor blade lift.

According to another aspect of the present invention, a first-actuator-failure flag is set when the first swashplate actuator failure is detected. This first-actuator-failure flag is input to the first-swashplate-actuator-failure control matrix, to render that control matrix operable. Similarly, a second-actuator-failure flag renders the second-swashplate-actuator-failure control matrix operable, and third-actuator-failure flag renders the third-swashplate-actuator-failure control matrix operable.

According to another aspect of the present invention, once any one of the three swashplate actuators is detected to be nonfunctional, the position of this nonfunctional swashplate is locked and measured. The inputted commanded swashplate collective position, commanded swashplate x-axis rotational position, and commanded swashplate y-axis rotational position are passed to a failure-mode control matrix when a failure of one of the swashplate actuators is detected. The failure-mode control matrix computes swashplate actuator commanded positions for the two operable swashplate actuators. These two swashplate actuator commanded positions instruct positional movement of the rotor blade swashplate to thereby meet the commanded swashplate x-axis rotational position and the commanded swashplate y-axis rotational position. A swashplate-collective-position corrector computes the quasi-swashplate collective position to thereby instruct positional movement of the rotor blade swashplate to approximate the commanded swashplate collective position. The swashplate-collective-position corrector then generates an amount of rotor blade lift to compensate for any difference between the commanded swashplate collective position and the quasi-swashplate collective position.

The present invention, together with additional features and advantages thereof, may best be understood by reference to the following description taken in connection with the accompanying illustrative drawings.

DESCRIPTION OF THE PREFERRED EMBODIMENT

Figure 1:
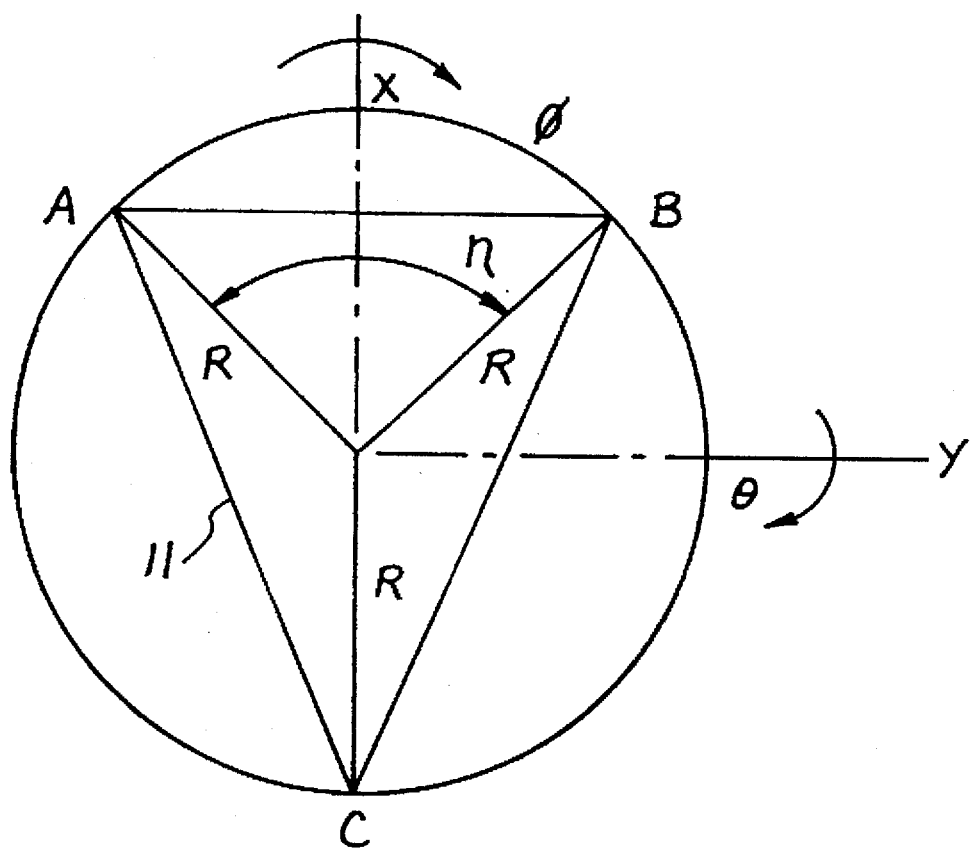
FIG. 1 is a top planar geometrical view of a helicopter rotor blade swashplate.

The typical rotor blade swashplate with a first swashplate actuator 13, a second swashplate actuator 15, and a third swashplate actuator 17 (the A, B, and C actuators, respectively) positioned at each corner of the inscribed triangle 11 is shown in FIG. 1. The first swashplate actuator 13 is commanded to move its corner of the triangle 11 in vertical directions represented by the variable $Z_A$. Similarly, the second swashplate actuator 15 and the third swashplate actuator 17 move corresponding vertices of the triangle 11 about vertical displacements $Z_B$ and $Z_C$, respectively. The vertical displacement of the center of the triangle 11 is denoted by the variable $Z_0$.

The variable $\phi$ denotes the angle of the rotor blade swashplate about the x-axis, and the variable $\theta$ denotes the angle of the rotor blade swashplate about the y-axis. When the x-axis and the y-axis are properly oriented with respect to the aircraft x-axis and y-axis, the $\theta$ and $\phi$ angles correspond to the conventional $B_{1s}$ and $A_{1s}$. The two variables $B_{1s}$ and $A_{1s}$ denote the conventional longitudinal and lateral cyclic control outputs, and the variable $Z_0$ corresponds to the swashplate collective control output. A discussion of the longitudinal and lateral cyclic controls $B_1$ and $A_1$ is given in U.S. Pat. No. 5,001,646 to Caldwell et al., issued on Mar. 19, 1991, and incorporated herein by reference. The geometric relationships for $Z_0$, $\theta$, and $\phi$ are given by:

$$z_0 = \frac{\frac{1}{2} z_A + \frac{1}{2} z_B + \cos\frac{\eta}{2} z_C}{1 + \cos\frac{\eta}{2}} \quad \text{Equation 1}$$

$$\theta = \frac{z_A + z_B - 2z_C}{2R\left(\cos\frac{\eta}{2} + 1\right)} \quad \text{Equation 2}$$

$$\phi = \frac{z_A - z_B}{2R\sin\frac{\eta}{2}} \quad \text{Equation 3}$$

Thus, in a helicopter flight control system, the pilot controls the flight control stick to command values of $Z_0$, $\theta$, and $\phi$. In the present invention, the swashplate actuator control computers receive these commanded values for the $Z_0$, $\theta$, and $\phi$ swashplate movements, and compute the vertical displacements for the first swashplate actuator 13, the second swashplate actuator 15, and the third swashplate actuator 17. The three equations for the first, second, and third swashplate actuator vertical displacements $Z_A$, $Z_B$, and $Z_C$ are given by:

$$Z_A = Z_0 + \theta R\cos\frac{\eta}{2} + \phi R\sin\frac{\eta}{2} \quad \text{Equation 4}$$

$$Z_B = Z_0 + \theta R\cos\frac{\eta}{2} - \phi R\sin\frac{\eta}{2} \quad \text{Equation 5}$$

$$Z_C = Z_0 - \theta R \quad \text{Equation 6}$$

The matrix representation of these three equations is given by:

$$\begin{bmatrix} z_A \\ z_B \\ z_C \end{bmatrix} = \begin{bmatrix} 1 & R\cos\frac{\eta}{2} & R\sin\frac{\eta}{2} \\ 1 & R\cos\frac{\eta}{2} & -R\sin\frac{\eta}{2} \\ 1 & -R & 0 \end{bmatrix} \begin{bmatrix} z_0 \\ \theta \\ \phi \end{bmatrix} \quad \text{Equation 7}$$

From the above Equations 4, 5 and 6, it is clear that failure of any one of the three swashplate actuators 13, 15, and 17 renders positioning of the remaining two swashplate actuators to achieve the commanded $Z_0$, $\theta$, and $\phi$ swashplate positions very difficult, if not impossible.

The present invention realizes that the three commanded variables of $Z_0$, $\theta$, and $\phi$ cannot all be met with only two of the three swashplate actuators 13, 15, and 17 operating. Thus, the present invention implements equations for solving the more critical values of $\theta$ and $\phi$ of the three commanded values $Z_0$, $\theta$, and $\phi$. These equations cannot generate an exact value for $Z_0$ but, instead, generate an approximation value for the swashplate collective position $Z_0'$, aimed at producing a desired rotor lift, even without commanding the correct value of $Z_0$.

When the first swashplate actuator 13 (the A actuator) has failed and been looked in a position A, then $Z_B$, $Z_C$, and $Z_0'$ can be calculated by the following matrix equation:

$$\begin{bmatrix} Z_B \\ Z_C \\ Z_0' \end{bmatrix} = \begin{bmatrix} A \\ A \\ A \end{bmatrix} + \begin{bmatrix} 0 & -2R\sin\left(\frac{\eta}{2}\right) \\ -R\left[1+\cos\left(\frac{\eta}{2}\right)\right] & -R\sin\left(\frac{\eta}{2}\right) \\ -R\cos\left(\frac{\eta}{2}\right) & -R\sin\left(\frac{\eta}{2}\right) \end{bmatrix} \begin{bmatrix} \theta \\ \phi \end{bmatrix} \quad \text{Equation 8}$$

When the second swashplate actuator 15 (the B actuator) has failed and has been measured in a position B, then $Z_A$, $Z_C$, and $Z_0'$ can be determined using the following matrix equation:

$$\begin{bmatrix} Z_A \\ Z_C \\ Z_0' \end{bmatrix} = \begin{bmatrix} B \\ B \\ B \end{bmatrix} + \begin{bmatrix} 0 & 2R\sin\left(\frac{\eta}{2}\right) \\ -R\left[1+\cos\left(\frac{\eta}{2}\right)\right] & +R\sin\left(\frac{\eta}{2}\right) \\ -R\cos\left(\frac{\eta}{2}\right) & +R\sin\left(\frac{\eta}{2}\right) \end{bmatrix} \begin{bmatrix} \theta \\ \phi \end{bmatrix} \quad \text{Equation 9}$$

When the third swashplate actuator 17 (the C actuator) has failed and been measured in a position C, the following matrix equation can be used to generate the $Z_A$, $Z_B$, and $Z_0'$ variables.

$$\begin{bmatrix} Z_A \\ Z_C \\ Z_0' \end{bmatrix} = \begin{bmatrix} C \\ C \\ C \end{bmatrix} + \begin{bmatrix} R\left[1+\cos\left(\frac{\eta}{2}\right)\right] & R\sin\left(\frac{\eta}{2}\right) \\ R\left[1+\cos\left(\frac{\eta}{2}\right)\right] & -R\sin\left(\frac{\eta}{2}\right) \\ R & 0 \end{bmatrix} \begin{bmatrix} \theta \\ \phi \end{bmatrix} \quad \text{Equation 10}$$

Figure 2:
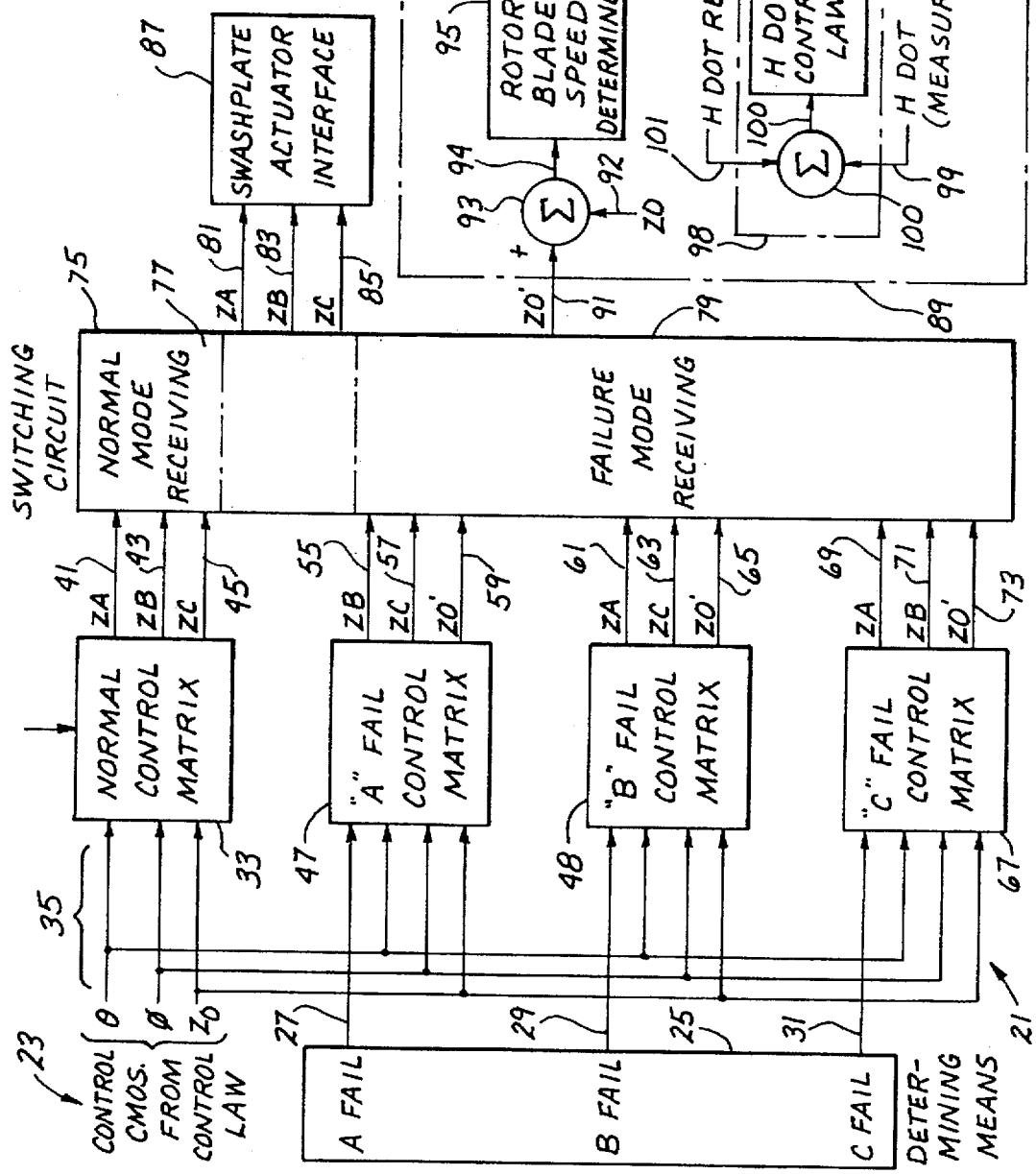
FIG. 2 is a block diagram illustrating portions of the reconfigurable helicopter flight control system of the presently preferred embodiment.

Turning to FIG. 2, a block diagram of the reconfigurable helicopter flight control system 21 of the presently preferred embodiment is shown. The commanded swashplate collective position $Z_0$, the commanded swashplate x-axis rotational position $\phi$, and the commanded swashplate y-axis rotational position $\theta$ are input into the reconfigurable helicopter flight control system by the inputting means 23. As mentioned above, the commanded swashplate collective position $Z_0$, the commanded swashplate x-axis rotational position $\theta$, and the commanded swashplate y-axis rotational position $\phi$ roughly correspond to movements of the flight stick by the helicopter pilot or control commands issued by a fly-by-wire computer system.

A determining means 25 determines whether the first swashplate actuator 13, the second swashplate actuator 15, or the third swashplate actuator 17 has failed. If the first swashplate actuator 13 has failed, a first-actuator-failure flag is set on line 27 by the determining means 25. Similarly, the determining means 25 sets a second-actuator-failure flag on line 29 when failure of the second swashplate actuator 15 is detected, and the determining means 25 sets a third-actuator-failure flag on line 31 when failure of the third swashplate actuator 17 is detected.

When neither the first swashplate actuator 13, the second swashplate actuator 15, nor the third swashplate actuator 17 has failed, the normal control matrix computing means 33 receives the commanded swashplate collective position $Z_0$, the commanded swashplate y-axis rotational position $\theta$, and the commanded swashplate x-axis rotational position $\phi$. The normal control matrix computing means 33 then implements the Equation 7 matrix equation to generate a first swashplate actuator commanded position $Z_A$, a second swashplate actuator commanded position $Z_B$, and a third swashplate actuator commanded position $Z_C$. The commanded swashplate collective position $Z_0$, the commanded swashplate y-axis rotational position θ, and the commanded swashplate x-axis rotational position φ are all input into the normal control matrix computing means 33 via lines 35, 37 and 39, respectively. The first swashplate actuator commanded position $Z_A$, the second swashplate actuator commanded position $Z_B$, and the third swashplate actuator commanded position $Z_C$ are output from the normal control matrix computing means 33 on lines 41, 43, and 45, respectively.

When the determining means 25 detects a failure of the first swashplate actuator 13 and sets the first-actuator-failure flag 27, the first-swashplate-actuator-failure control matrix computing means 47 receives the commanded swashplate collective position $Z_0$, the commanded swashplate y-axis rotational position θ, and the commanded swashplate x-axis rotational position φ via lines 49, 51, and 53. When the first-swashplate-actuator-failure control matrix computing means also receives the first-actuator-failure flag on line 27, it generates and outputs a second swashplate actuator commanded position $Z_B$ on line 55, a third swashplate actuator commanded position on line 57, and a quasi-swashplate collective position on line 59. The first-swashplate-actuator-failure control matrix computing means 47 generates the second swashplate actuator commanded position $Z_B$, the third swashplate actuator commanded position $Z_C$, and the quasi-swashplate collective position $Z_0'$ using the matrix Equation 8 given above.

In a similar way, the second-swashplate-actuator-failure control matrix computing means 48 receives the second-actuator-failure flag from the determining means 25 on line 29, and generates a first swashplate actuator commanded position on line 61, a third swashplate actuator commanded position on line 63, and a quasi-swashplate collective position on line 65. Similarly, when the third-swashplate-actuator-failure control matrix computing means 67 receives the third-actuator-failure flag on line 31, it uses the commanded swashplate collective position $Z_0$, the commanded swashplate x-axis rotational position θ, and the commanded swashplate y-axis rotational position φ to generate and output a first swashplate actuator commanded position $Z_A$ on line 69, a second swashplate actuator commanded position $Z_B$ on line 71, and a quasi-swashplate collective position $Z_0'$ on line 73.

The switching circuit 75 generally comprises a normal-mode receiving means 77 and a failure-mode receiving means 79. The normal-mode receiving means basically passes the first swashplate actuator commanded position on line 41, the second swashplate actuator commanded position on line 43, and the third swashplate actuator commanded position on line 45 to the three output lines 81, 83, and 85, respectively.

The swashplate actuator interface 87 receives these three inputs on lines 81, 83, and 85 and controls the first swashplate actuator 13, the second swashplate actuator 15, and the third swashplate actuator 17, accordingly.

The failure-mode receiving means 79 of the switching circuit 75, on the other hand, generally operates to forward the outputs from the first, second, and third-swashplate-actuator-failure control matrix computing means 47, 48, and 67, respectively, to the swashplate actuator interface 87 and the swashplate collective position controller 89.

When either the first swashplate actuator 13, the second swashplate actuator 15, or the third swashplate actuator 17 has failed, then the two swashplate actuator commanded positions corresponding to the two functional swashplate actuators are routed from the corresponding swashplate-actuator-failure control matrix computing means through the failure-mode receiving means 79 and to the swashplate actuator interface 87. Since a quasi-swashplate collective position, instead of a swashplate actuator commanded position, is output from each of the swashplate-actuator-failure control matrix computer means for the failed swashplate actuator, a swashplate commanded position corresponding to the failed swashplate actuator is never routed through the failure-mode receiving means to the swashplate actuator interface 87. Instead, the swashplate-actuator-failure control matrix computing means corresponding to the failed swashplate actuator outputs a quasi-swashplate collective position $Z_0'$ to the failure-mode receiving means 79.

When the failure-mode receiving means receives a quasi-swashplate collective position corresponding to a failed swashplate actuator, the failure-mode receiving means 79 passes this quasi-swashplate collective position to the swashplate-collective-position corrector 89, via line 91.

For example, if a failure of the third swashplate actuator 17 is detected by the determining means 25, then the third-swashplate-actuator-failure control matrix computing means 67 generates and provides the first swashplate actuator commanded position on line 69, the second swashplate actuator commanded position on line 71, and the quasi-swashplate collective position on line 73. The failure-mode receiving means 79 forwards the first swashplate actuator commanded position and the second swashplate actuator commanded position to the swashplate actuator interface 87 via lines 81 and 83, respectively. Further, the failure-mode receiving means 79 forwards the quasi-swashplate collective position, input on line 73, to the swashplate-collective-position corrector 89 via line 91.

The swashplate-collective-position corrector 89 comprises a swashplate-collective-position difference determiner 93, a rotor blade speed determiner 95, a rotor-blade-speed-command generator 97, an aircraft vertical velocity controller 98, a limiter 103, and an engine speed controller 105. The swashplate-collective-position difference determiner 93 inputs the quasi-swashplate collective position $Z_0'$ on line 91 and the commanded swashplate collective position $Z_0$ on line 92. The difference between these two signals is output on line 94 as a swashplate-collective-position difference. The swashplate-collective-position difference 94 represents an error signal between the commanded swashplate collective position $Z_0$ and the quasi-swashplate collective position $Z_0'$ which was generated as an estimate of the attainable swashplate collective position $Z_0$, when only two of three actuators are controllable.

This swashplate-collective-position difference 94, which is a measure of the rotor blade thrust deficiency or surplus, is input into the rotor blade speed determiner 95. The rotor blade speed determiner 95 determines a change in rotor blade speed (ΔΩ) which is needed to compensate for the swashplate-collective-position difference 94 which corresponds to a rotor thrust deficiency. The rotor blade speed determiner 95 may comprise calibration look-up tables defining the needed rotor lift for each flight condition, for example.

The rotor blade speed determiner 95 outputs a change in rotor blade speed ΔΩ on line 96. This change in rotor blade speed ΔΩ on line 96 is input into the rotor-blade-speed-command generator 97, along with a reference rotor blade speed $Ω_{Ref}$ on line 107. The reference rotor blade speed on line 107 is normally set to 100 percent of the rotor blade speed, although in aircraft using a single engine and capable of both fixed and rotational winged flight this reference rotor blade speed may vary from greater than 100 percent down to 70 percent, for example. Such an aircraft is described in copending U.S. patent application Ser. No. 568,144, filed Dec. 6, 1995 of which applicant is the sole inventor, titled Flight Control System for Jet Powered Tri-Mode Aircraft, the details of which are incorporated herein by reference. Since rotor blade lift tends to vary with $\Omega^2$, changing the rotor blade speed by plus or minus ten percent about 100 percent results in a change in vertical thrust of about plus or minus 20 percent.

The rotor blade speed determiner 95 thus provides a predicted change in rotor blade speed on line 96 which, if achieved by the engine speed control, will result in the desired rotor thrust. That change in speed command 96 can be added to the reference rotor blade speed on line 107 to thereby generate an approximation of the required rotor blade speed.

This estimation of the required rotor blade speed is augmented by a closed loop process to correct for approximations in the estimates described above. That closed loop process uses the aircraft vertical velocity controller 98. The aircraft vertical velocity controller 98 constantly measures the vertical velocity (Hdot), which is input on line 99. Also input on line 101 is a reference vertical velocity ($Hdot_{Ref}$). The measured vertical velocity on line 99 and the reference vertical velocity on line 101 are both input into the aircraft-vertical-velocity difference determining means 109, which outputs an aircraft vertical velocity difference on line 100.

If, for example, the estimated change in rotor blade speed is accurate, and that speed is attainable by the engine speed controller 105, then a desired equilibrium in the aircraft's vertical axis will be achieved. In effect, the change in rotor blade speed ($\Delta\phi$) 96, plus the reference rotor blade speed ($\Omega$Ref) 107 will produce an altered speed reference for the rotor blade speed command ($\Omega$Ref') 104, and that value of $\Omega$Ref' will provide the rotor thrust that exactly compensates for the unavailable collective control, as defined by the difference between $Z_0$ and $Z_0$'. If, however, that estimated change in rotor blade speed ($\Delta\Omega$) on line 96 is not accurate, then the desired equilibrium of vertical forces acting on the aircraft will not be present. That departure from equilibrium appears as an aircraft vertical velocity difference (or error) 100. The Hdot control law, which is implemented by the aircraft-vertical-velocity-error-to-rotor-blade-speed converter 101, is the closed loop process which commands an increment or decrement to the rotor blade speed command ($\Omega$Ref') 104 by adding the closed loop adjustment to the reference rotor blade speed ($\Omega$Ref) 107 at the rotor-blade-speed-command generator 97.

The rotor-blade-speed-command generator 97 thus sums the reference rotor blade speed on line 107, the change in rotor blade speed on line 96, and the rotor blade speed correction on line 102, and outputs the rotor blade speed command 104. This rotor blade speed command 104 represents an amount of rotor blade lift required to compensate for the difference between the commanded swashplate collective position input on line 92 and the quasi-swashplate collective position input on line 91.

An appropriate limit on the allowable range of the rotor blade speed command 104 should be applied to avoid operating in regions that are dynamically unacceptable. The limiter 103 thus limits the rotor blade speed command 104 to within a range a predetermined values, and outputs a limited rotor blade speed command 106. The engine speed controller 105 receives the limited rotor blade speed command 106 and outputs a rotor blade torque 113 to drive the rotor blade.

Figure 3:
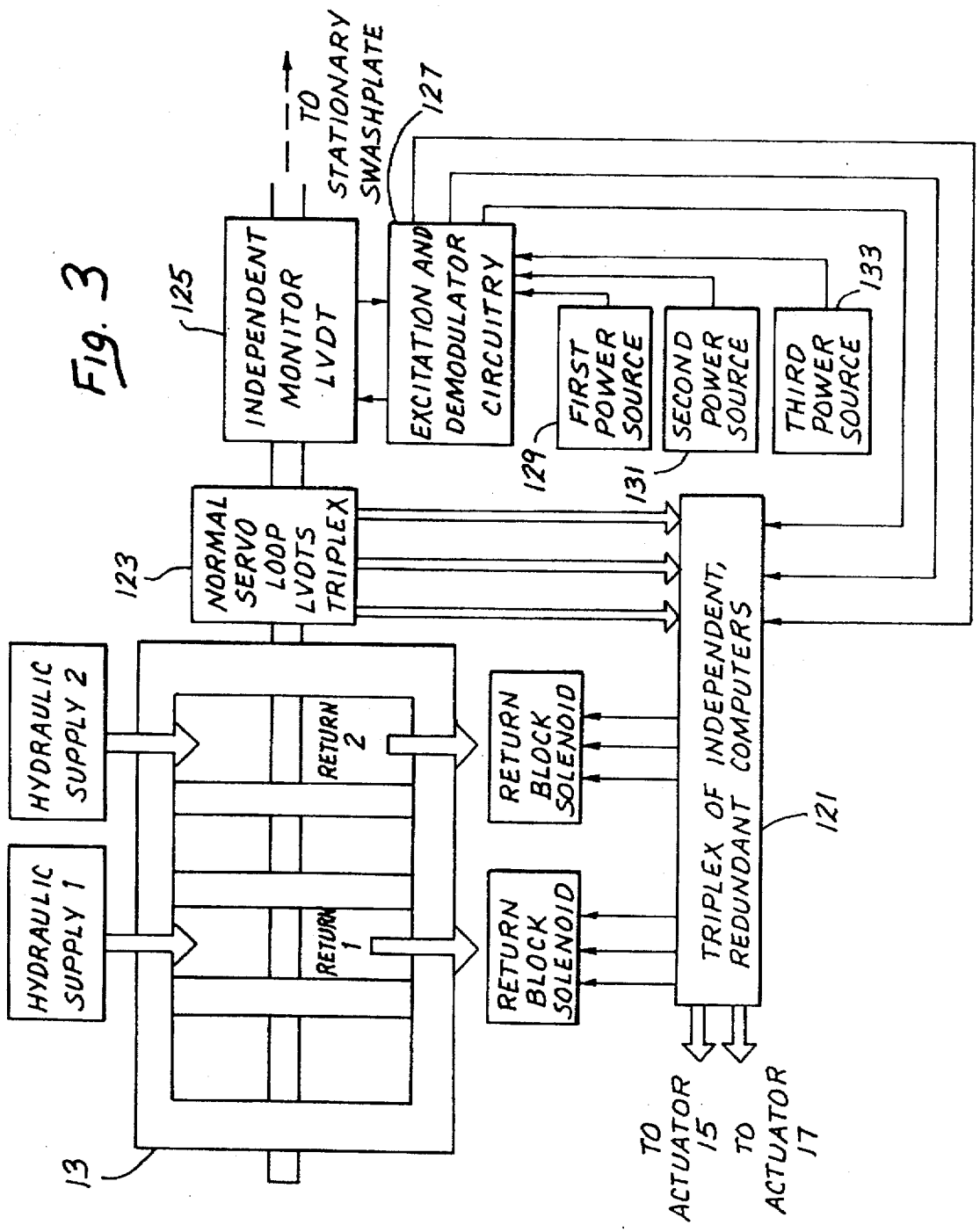
FIG. 3 is a schematic representation of a swashplate actuator and associated components according to the presently preferred embodiment.

FIG. 3 illustrates a top-level schematic of the actuator function requirements for implementing an emergency backup function when one of the first, second, and third swashplate actuators 13, 15, and 17 has failed. Specifically, FIG. 3 illustrates a failure of the first swashplate actuator 13. In the presently preferred embodiment, each of the first, second, and third swashplate actuators 13, 15, 17 comprises a dual-tandem electro-hydraulic swashplate actuator. All of the first, second, and third swashplate actuators 13, 15, 17 are monitored using combinations of model monitors that compare actual swashplate actuator responses to expected swashplate actuator responses, and also using comparisons of redundant elements within a given swashplate actuator subsystem.

In redundant swashplate actuator mechanizations, the role of the monitors is primarily to minimize or suppress the effects of a first failure by isolating and removing the failed elements from the system, and allowing the non-failed elements to continue performing their functions without performance degradation.

FIG. 3 shows only those parts of a swashplate actuator that are involved in the present embodiment which addresses operation after the more common redundant elements are no longer able to assure continued operation of the actuator as a positioning servo. Elements of the servo loops not shown in this figure include the redundant servo control valves and their associated servo amplifier drives. In normal operation with a triplex system, a triplex of normal servo loop Linear Variable Differential Transducers (LVDTs) 123 is mounted to measure actuator position. These redundant position measurements are used in the servo loop closures. They are also used to monitor the integrity of the servo's positioning response. In that normal operation, a variety of malfunctions in one of the redundant channels can cause an error in the positioning performance. The existing monitors will normally isolate and shut-down the failed element and allow the functioning parts of the system to continue operation without the impairment of the failed element. The triplex of normal servo loop LVDTs 123 is part of this normal actuator monitoring process. When those normal monitoring algorithms determine that a total shut-down of the actuator has occurred because there are no surviving elements of the redundant mechanism, the present embodiment of a survivable reconfiguration is activated. In the presently preferred embodiment, each of the model monitors comprises an LVDT and the associated redundant computers. The presently preferred embodiment is concerned with reconfiguring swashplate actuators that can no longer perform their task. In a redundant system, for example, the presently preferred embodiment disables and locks the actuator and uses an alternate independent measure of swashplate actuator position only when all remaining capability of that swashplate actuator is lost. For non-redundant systems, the presently preferred embodiment is concerned with the first detected failure covering a condition where the swashplate actuator can no longer perform in even a minimal manner.

When the first, second, and third swashplate actuators 13, 15, and 17, respectively, are all operating properly, a normal-operations flag 32 (FIG. 2) is set to thereby enable the normal control matrix computing means 33 (FIG. 2). In a simple, non-redundant system the normal-operations flag 32 remains set as long as all of the swashplate actuators have passed their continuous monitoring routines, verifying that all commanded swashplate actuator positions are being attained within reasonable static and dynamic tolerances.

In more complex, redundant fly-by-wire systems, the decision that a critical swashplate actuator can no longer function acceptably must be made by agreement of all of the working redundant computer channels. FIG. 3 illustrates the presently preferred embodiment, where a triplex of three independent, redundant computers 121 monitors the positions of swashplate actuators 13, used as an example of each actuator in this figure. To prevent nuisance engagements of the emergency back-up function of the present invention, all three of the triplex of independent, redundant computers 121 must agree that the specific swashplate actuator has indeed failed.

Information pertaining to the operation of each of the first, second, and third swashplate actuators 13, 15, and 17 is exchanged between each of the triplex of independent, redundant computers 121 via "cross channel data links," which are the critical means of verifying multiple channel measurements and information processed from these measurements. Thus, each of the three computers of the triplex of independent, redundant computers 121 acts as a separate channel, which carries information relating to swashplate measurements and signal integrity thereon. High integrity of the processing and exchange of information between each of the three channels, and voting on the basis of common data being processed, is presently embodied.

The triplex of normal servo loop LVDTs 123 comprises three independent, redundant LVDT position transducers. While shown as LVDTs, which are the most common type of position transducer used in aircraft servo actuators, these position measuring transducers can also be of many alternative types that can give equivalent accuracy and reliability. Each LVDT of the triplex of normal servo loop LVDTs 123 interfaces with one of the triplex of independent, redundant computers 121. Each of these LVDTs in the triplex of normal servo loop LVDTs 123 independently measures the swashplate actuator position for the specific swashplate actuator on which it is mounted. Thus, if the figure illustrates the case of swashplate actuator 13, all three of the LVDTs in the triplex of normal servo loop LVDTs 123 measures the position of the swashplate actuator 13, with each computer in the triplex of independent, redundant computers 121 providing power excitation and signal integrity monitoring for one of the three LVDTs in the triplex of normal servo loop LVDTs 123.

Each computer in the triplex of independent, redundant computers 121 receives the position measurement of the swashplate 13 directly from one of the LVDTs in the triplex of normal servo loop LVDTs 123, and shares this information with the other two computers of the triplex of independent, redundant computers 121 via the cross-channel data link. Likewise, the other two computers in the triplex of independent, redundant computers 121 each have their own position measurement of the swashplate actuator 13 via their own interface with the other LVDTs in the triplex of normal servo loop LVDTs 123. Each of these two other computers in the triplex of independent, redundant computers 121 shares its swashplate actuator 13 position measurement with the other two computers via the cross-channel data link. Hence, each of the three computers of the triplex of independent, redundant computers 121 has access to all three LVDT measurements, and common voting algorithms allow all three of the computers in the triplex of independent, redundant computers 121 to use the same estimate of position for swashplate actuator 13 for their monitoring algorithms. When all three of the computers of the triplex of independent, redundant computers 121 agree that swashplate actuator 13 has failed, the locked position of that swashplate actuator is obtained from an independent monitor LVDT 125.

The independent monitor LVDT 125 has its own electronic interface with the excitation and demodulator circuitry 127 for providing the oscillator excitation and for the signal demodulation. The excitation and demodulator circuitry 127 also provides similar inputs to the triplex of independent, redundant computers 121. Three separate power supplies 129, 131, and 133 supply power to the excitation and demodulator circuitry 127. These three separate power supplies 129, 131, 133 enhance the reliability and invulnerability to power transients that may have originally contributed to the original, detected swashplate actuator fault.

The position of the failed swashplate actuator output from the independent monitor LVDT 125 is compared with an estimate of the position of the failed swashplate actuator from the tripiex of independent, redundant computers 121. The triplex of independent, redundant computers 121 generates the estimate of the position of the failed swashplate actuator from the data exchange between the three computers 121 via the cross channel data links, after each of the three computers has read its own monitor LVDT value from the triplex of normal servo loop LVDTs 123. In the presently preferred embodiment, if, during normal, non-failed mode operation, the independent monitor LVDT 125 does not provide a reasonable agreement with the estimate of the failed swashplate actuator position from the triplex of independent, redundant computers 121, then a cautionary warning is issued, and the emergency mode is disabled until maintenance action can be taken to repair the independent monitor LVDT 125.

Figure 4:
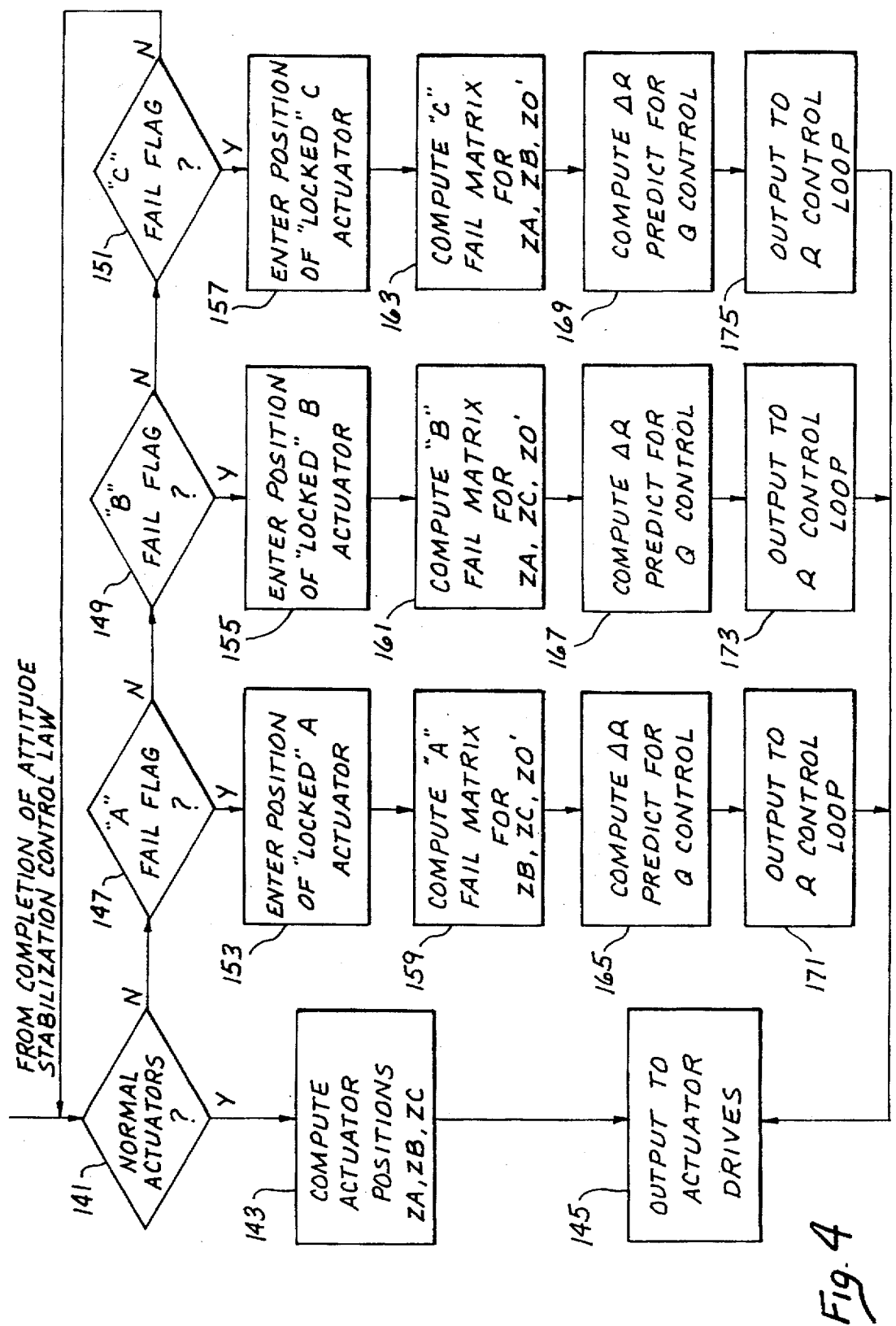
FIG. 4 is a flow chart illustrating the method of the present invention.

FIG. 4 is a flow chart illustrating a portion of the method of the presently preferred embodiment. When the determining means 25 (FIG. 2) determines that the first, second, and third swashplate actuators 13, 15, and 17 are all operating properly, (Step 141) program flow advances to Step 143. At Step 143 the first swashplate actuator commanded position $Z_A$, second swashplate actuator commanded position $Z_B$, and the third swashplate actuator commanded position $Z_C$ are computed by the normal control matrix computing means 33 (FIG. 2). This data is output to the swashplate actuator drives at Step 145.

If, on the other hand, the determining means 25 determines that the first swashplate actuator 13 has failed, then the first-actuator-failure flag is set on line 27 at Step 147. Similarly, the second-actuator-failure flag, corresponding to failure of the second swashplate actuator 15, may be set at Step 149, and the third-actuator-failure flag, corresponding to a detected failure of the third swashplate actuator 17, may be set at Step 151.

When the first-actuator-failure flag is set on line 27, the position of the failed and locked first swashplate actuator 13 is generated at Step 153. Similarly, at Steps 155 and 157, the positions of the failed second swashplate actuator 15 and the failed third swashplate actuator 17, respectively, may be generated. At Steps 159, 161, and 163, the first, second, and third swashplate-actuator-failure control matrix computing means 47, 48, and 67, respectively, generate and output appropriate values of swashplate actuator commanded positions and quasi-swashplate collective positions.

At Steps 165, 167, and 169, the respective change in rotor blade speed signal on line 96 of FIG. 2 is compared to the respective reference rotor blade speed on line 107 of FIG. 2. At Steps 171, 173, and 175 the rotor blade speed corrections on line 102 from the aircraft vertical velocity controller 98 are incorporated, and corresponding outputs from the rotor-blade-speed-command generator 97 are generated and processed, and finally, the position commands to the swashplate actuator drives are issued at Step 145.

Although the presently preferred embodiment locks a failed swashplate actuator into its failed position in the emergency back-up mode, more complex mechanisms may be implemented. For example, a mechanism that would return the failed actuator to its most advantageous position and then cause it to enter into hydraulic lock could be used, but this structure would be more complex and expensive. In the presently preferred embodiment, as shown in FIG. 3, the failed swashplate actuator is locked upon a unanimous decision by all working computers in the triplex of independent, redundant computers 121, to effectively prevent return flow through the corresponding return block solenoid of the failed swashplate actuator. In redundant swashplate actuator systems, failed parts are usually bypassed to prevent them from jamming and disrupting the operation of working sections. In such a configuration, a portion of the bypass mechanisms must be disabled before the locked state is entered. This function is directed by the triplex of independent, redundant computers 121.

Although an exemplary embodiment of the invention has been shown and described, many other changes, modifications and substitutions, in addition to those set forth in the above paragraph, may be made by one having ordinary skill in the art without necessarily departing from the spirit and scope of this invention.

I claim:

1. A reconfigurable helicopter flight control system, comprising:

inputting means for inputting a commanded swashplate collective position, a commanded swashplate x-axis rotational position, and a commanded swashplate y-axis rotational position;

determining means for determining whether any one of a first swashplate actuator, a second swashplate actuator, and a third swashplate actuator is no longer functional;

normal control matrix computing means for receiving the commanded swashplate collective position, the commanded swashplate x-axis rotational position, and the commanded swashplate y-axis rotational position, and for generating and outputting a first swashplate actuator commanded position, a second swashplate actuator commanded position, and a third swashplate actuator commanded position, in an event that the determining means determines that the first swashplate actuator, the second swashplate actuator, and the third swashplate actuator are all functional;

first-swashplate-actuator-failure control matrix computing means for receiving the commanded swashplate collective position, the commanded swashplate x-axis rotational position, and the commanded swashplate y-axis rotational position, and for generating and outputting a second swashplate actuator commanded position, a third swashplate actuator commanded position, and a quasi-swashplate collective position, these generated positions assuring that aircraft attitude control will be maintained in an event that the determining means determines that the first swashplate actuator is no longer functional;

second-swashplate-actuator-failure control matrix computing means for receiving the commanded swashplate collective position, the commanded swashplate x-axis rotational position, and the commanded swashplate y-axis rotational position, and for generating and outputting a first swashplate actuator commanded position, a third swashplate actuator commanded position, and a quasi-swashplate collective position, these generated positions assuring that aircraft attitude control will be maintained in an event that the determining means determines that the second swashplate actuator is no longer functional;

third-swashplate-actuator-failure control matrix computing means for receiving the commanded swashplate collective position, the commanded swashplate x-axis rotational position, and the commanded swashplate y-axis rotational position, and for generating and outputting a first swashplate actuator commanded position, a second swashplate actuator commanded position, and a quasi-swashplate collective position, these generated positions assuring that aircraft attitude control will be maintained in an event that the determining means determines that the third swashplate actuator is no longer functional;

normal-mode receiving means for passing the first swashplate actuator commanded position, the second swashplate actuator commanded position, and the third swashplate actuator commanded position, in the event that the determining means determines that the first swashplate actuator, the second swashplate actuator, and the third swashplate actuator are all functional; and failure-mode receiving means for receiving any three of the first swashplate actuator commanded position, the second swashplate actuator commanded position, the third swashplate actuator commanded position, and the quasi-swashplate collective position, from one of the first-swashplate-actuator-failure control matrix computing means, the second-swashplate-actuator-failure control matrix computing means, and the third-swashplate-actuator-failure control matrix computing means, the failure-mode receiving means also for outputting both the quasi-swashplate collective position and two of the first swashplate actuator commanded position, the second swashplate actuator commanded position, and the third swashplate actuator commanded position, in the event that the determining means determines that one of the first swashplate actuator, the second swashplate actuator, and the third swashplate actuator is not functional.

2. The reconfigurable helicopter flight control system according to claim 1, further comprising:

swashplate-collective-position correcting means for inputting both the commanded swashplate collective position and the quasi-swashplate collective position, which is a collective position that will result when one of the first, second, and third swashplate actuators is not functional and is locked, and when positions of the remaining two actuators, which are functional, are controlled, and for outputting a rotor blade speed change corresponding to an amount of rotor blade lift needed to correct for any difference between the commanded swashplate collective position and the quasi-swashplate collective position.

3. The reconfigurable helicopter flight control system according to claim 2, wherein the swashplate-collective-position correcting means further comprises:

swashplate-collective-position difference determining means for inputting both the commanded swashplate collective position and the quasi-swashplate collective position, and for outputting a swashplate-collective-position difference, the swashplate-collective-position difference representing a difference between the commanded swashplate collective position and the quasi-swashplate collective position.

4. The reconfigurable helicopter flight control system according to claim 3, wherein the swashplate-collective-position difference correcting means further comprises:

rotor-blade-speed determining means for inputting the swashplate-collective-position difference from the swashplate-collective-position difference determining means, and for outputting a change in rotor blade speed, the change in rotor blade speed corresponding to the amount of rotor blade lift needed to correct for any difference between the commanded swashplate collective position and the quasi-swashplate collective position.

5. The reconfigurable helicopter flight control system according to claim 4, wherein the swashplate-collective-position correcting means further comprises:

aircraft-vertical-velocity controlling means for inputting a commanded aircraft vertical velocity and a measured aircraft vertical velocity, and for outputting a rotor blade speed correction.

6. The reconfigurable helicopter flight control system according to claim 5, wherein the rotor blade speed correction corresponds to a difference between the commanded aircraft vertical velocity and the measured aircraft vertical velocity.

7. The reconfigurable helicopter flight control system according to claim 5, wherein the aircraft-vertical-velocity controlling means further comprises:

aircraft-vertical-velocity difference determining means for inputting the commanded aircraft vertical velocity and the measured aircraft vertical velocity, and for outputting an aircraft vertical velocity difference.

8. The reconfigurable helicopter flight control system according to claim 7, wherein the aircraft vertical velocity difference corresponds to a difference between the commanded aircraft vertical velocity and the measured aircraft vertical velocity.

9. The reconfigurable helicopter flight control system according to claim 7, wherein the aircraft-vertical-velocity controlling means further comprises:

aircraft-vertical-velocity-to-rotor-blade-speed converting means for converting the aircraft vertical velocity difference to the rotor blade speed correction.

10. The reconfigurable helicopter flight control system according to claim 9, wherein the aircraft-vertical-velocity-to-rotor-blade-speed converting means inputs the aircraft vertical velocity difference and outputs the rotor blade speed correction, and wherein the rotor blade speed correction is a change to the rotor blade speed that is predicted to bring the measured aircraft vertical velocity closer to the commanded aircraft vertical velocity.

11. The reconfigurable helicopter flight control system according to claim 9, wherein the swashplate-collective-position difference determining means further comprises:

rotor-blade-speed-command generating means for inputting the change in rotor blade speed from the rotor blade speed determining means, for summing the change in rotor blade speed with a reference rotor blade speed, and for outputting a rotor blade speed command.

12. The reconfigurable helicopter flight control system according to claim 11, wherein the rotor blade speed command instructs a percentage change in rotor blade speed.

13. The reconfigurable helicopter flight control system according to claim 11, wherein the rotor-blade-speed-command generating means further inputs the rotor blade speed correction output from the aircraft-vertical-velocity-to-rotor-blade-speed converting means.

14. The reconfigurable helicopter flight control system according to claim 13, wherein the rotor-blade-speed-command generating means not only sums the change in rotor blade speed with a reference rotor blade speed, but also sums the change in rotor blade speed with the rotor blade speed correction output from the aircraft-vertical-velocity-to-rotor-blade-speed converting means, and wherein the rotor blade speed command represents a summation of the change in rotor blade speed, the reference rotor blade speed, and the rotor blade speed correction.

15. The reconfigurable helicopter flight control system according to claim 14, the swashplate collective position correcting means further comprising:

limiting means for inputting the rotor blade speed command output from the rotor-blade-speed-command generating means and for outputting a limited rotor blade speed command, the limited rotor blade speed command representing a version of the rotor blade speed command that is limited to within a range of predetermined values.

16. The reconfigurable helicopter flight control system according to claim 15, the swashplate collective position correcting means further comprising:

engine speed controlling means for inputting the limited rotor blade speed command and for controlling an aircraft engine to generate rotor blade torque to drive an aircraft rotor blade at a rotor blade speed commanded by the limited rotor blade speed command.

17. The reconfigurable helicopter flight control system according to claim 1, wherein the normal-mode receiving means and the failure-mode receiving means together comprise a switching circuit.

18. The reconfigurable helicopter flight control system according to claim 1, wherein the failure-mode receiving means includes first operating means for operating in the event that the determining means determines that the first swashplate actuator is not functional, the first operating means comprising:

first receiving means for receiving the second swashplate actuator commanded position, the third swashplate actuator commanded position, and the quasi-swashplate collective position, from the first-swashplate-actuator-failure control matrix computing means; and first outputting means for outputting the quasi-swashplate collective position, the second swashplate actuator commanded position, and the third swashplate actuator commanded position.

19. The reconfigurable helicopter flight control system according to claim 18, wherein the failure-mode receiving means includes second operating means for operating in the event that the determining means determines that the second swashplate actuator is not functional, the second operating means comprising:

second receiving means for receiving the first swashplate actuator commanded position, the third swashplate actuator commanded position, and the quasi-swashplate collective position, from the second-swashplate-actuator-failure control matrix computing means; and second outputting means for outputting the quasi-swashplate collective position, the first swashplate actuator commanded position, and the third swashplate actuator commanded position.

20. The reconfigurable helicopter flight control system according to claim 19, wherein the failure-mode receiving means includes third operating means for operating in the event that the determining means determines that the third swashplate actuator is not functional, the third operating means comprising:

third receiving means for receiving the first swashplate actuator commanded position, the second swashplate actuator commanded position, and the quasi-swashplate collective, position, from the third-swashplate-actuator-failure control matrix computing means; and third outputting means for outputting the quasi-swashplate collective position, the first swashplate actuator commanded position, and the second swashplate actuator commanded position.

21. The reconfigurable helicopter flight control system according to claim 20, further comprising:

a first-actuator-failure flag which is set by the determining means when the determining means determines that the first swashplate actuator is no longer functional;

a second-actuator-failure flag which is set by the determining means when the determining means determines that the second swashplate actuator is no longer functional; and a third-actuator-failure flag which is set by the determining means when the determining means determines that the third swashplate actuator is no longer functional.

22. The reconfigurable helicopter flight control system according to claim 21, wherein the first-swashplate-actuator-failure control matrix comprises a first flag inputting means for inputting the first-actuator-failure flag when the determining means determines that the first swashplate actuator is no longer functional, wherein the second-swashplate-actuator-failure control matrix comprises a second flag inputting means for inputting the second-actuator-failure flag when the determining means determines that the second swashplate actuator is no longer functional, and wherein the third-swashplate-actuator-failure control matrix comprises a third flag inputting means for inputting the third-actuator-failure flag when the determining means determines that the third swashplate actuator is no longer functional.

23. The reconfigurable helicopter flight control system according to claim 22, further comprising:

a swashplate actuator interface for receiving two or more of the first swashplate actuator commanded position, the second swashplate actuator commanded position, and the third swashplate actuator commanded position, and for controlling a corresponding two or more of a first swashplate actuator, a second swashplate actuator, and a third swashplate actuator according to the received two or more of the first swashplate actuator commanded position, the second swashplate actuator commanded position, and the third swashplate actuator commanded position.

24. The reconfigurable helicopter flight control system according to claim 23, wherein when the determining means determines that the first swashplate actuator, the second swashplate actuator, and the third swashplate actuator are all functional, the swashplate actuator interface receives the first swashplate actuator commanded position, the second swashplate actuator commanded position, and the third swashplate actuator commanded position, and wherein when the determining means determines that the first swashplate actuator, the second swashplate actuator, and the third swashplate actuator are all functional, the swashplate actuator interface controls the first swashplate actuator, the second swashplate actuator, and the third swashplate actuator.

25. The reconfigurable helicopter flight control system according to claim 23, wherein when the determining means determines that the first swashplate actuator is not functional, the swashplate actuator interface receives the second swashplate actuator commanded position and the third swashplate actuator commanded position, and wherein when the determining means determines that the first swashplate actuator is not functional, the swashplate actuator interface controls the second swashplate actuator and the third swashplate actuator.

26. The reconfigurable helicopter flight control system according to claim 23, wherein when the determining means determines that the second swashplate actuator is not functional, the swashplate actuator interface receives the first swashplate actuator commanded position and the third swashplate actuator commanded position, and wherein when the determining means determines that the second swashplate actuator is not functional, the swashplate actuator interface controls the first swashplate actuator and the third swashplate actuator.

27. The reconfigurable helicopter flight control system according to claim 23, wherein when the determining means determines that the third swashplate actuator is not functional, the swashplate actuator interface receives the first swashplate actuator commanded position and the second swashplate actuator commanded position, and wherein when the determining means determines that the third swashplate actuator is not functional, the swashplate actuator interface controls the first swashplate actuator and the second swashplate actuator.

28. The reconfigurable helicopter flight control system according to claim 23, wherein when the determining means determines that the first swashplate actuator, the second swashplate actuator, and the third swashplate actuator are all functional, the swashplate-collective-position correcting means does not receive the quasi-swashplate collective position.

29. The reconfigurable helicopter flight control system according to claim 23, wherein when the determining means determines that one of the first swashplate actuator, the second swashplate actuator, and the third swashplate actuator is not functional, the swashplate-collective-position correcting means receives the quasi-swashplate collective position.

30. A reconfigurable helicopter flight control system, comprising:

determining means for determining whether any one of a first swashplate actuator, a second swashplate actuator, and a third swashplate actuator is no longer functional, and for generating a fail-mode signal upon a determination that one of the first swashplate actuator, the second swashplate actuator, and the third swashplate actuator is no longer functional;

swashplate-actuator-failure control matrix computing means for receiving a commanded swashplate collective position, a commanded swashplate x-axis rotational position, and a commanded swashplate y-axis rotational position, upon a determination that one of the first swashplate actuator, the second swashplate actuator, and the third swashplate actuator is no longer functional, the swashplate-actuator-failure control matrix computing means also generating and outputting a quasi-swashplate collective position and two of a first swashplate actuator commanded position, a second swashplate actuator commanded position, and a third swashplate actuator commanded position, upon a determination that one of the first swashplate actuator, the second swashplate actuator, and the third swashplate actuator is no longer functional; and a switching circuit for receiving the quasi-swashplate collective position and two of the first swashplate actuator commanded position, the second swashplate actuator commanded position, and the third swashplate actuator commanded position, the switching circuit outputting the quasi-swashplate collective position to a swashplate collective position correcting means, and for outputting the two of the first swashplate actuator commanded position, the second swashplate actuator commanded position, and the third swashplate actuator commanded position to a swashplate actuator interface.

31. The reconfigurable helicopter flight control system according to claim 30, wherein the swashplate-actuator-failure control matrix computing means comprises a first swashplate-actuator-failure control matrix computing means, a second swashplate-actuator-failure control matrix computing means, and a third swashplate-actuator-failure control matrix computing means.

32. The reconfigurable helicopter flight control system according to claim 30, wherein the swashplate collective position correcting means receives the quasi-swashplate collective position from the switching circuit and computes an amount of rotor blade speed change to compensate for any difference in rotor blade lift between the commanded swashplate collective position and the quasi-swashplate collective position.

33. A reconfigurable helicopter flight control system, comprising:

inputting means for inputting a commanded swashplate collective position, a commanded swashplate x-axis rotational position, and a commanded swashplate y-axis rotational position;

determining means for determining that one of a plurality of swashplate actuators is non-functional;

locking means for locking a position of the non-functional swashplate actuator;

measuring means for measuring the locked position of the non-functional swashplate actuator;

computing means for computing two of a first swashplate actuator commanded position, a second swashplate actuator commanded position, and a third swashplate actuator commanded position, the computed two of the first swashplate actuator commanded position, the second swashplate actuator commanded position, and the third swashplate actuator commanded position instructing positional movement of a rotor blade swashplate to meet the commanded swashplate x-axis rotational position, and the commanded swashplate y-axis rotational position;

quasi-swashplate collective position computing means for computing a quasi-swashplate collective position that is an estimate of where a swashplate collective position will occur because control is exercised over only two remaining swashplate positions, wherein the quasi-swashplate collective position will not usually be equal to the commanded swashplate collective position;

swashplate collective position correcting means for generating a rotor blade speed to supplement the quasi-swashplate collective position to thereby meet the lift equivalent of the commanded swashplate collective position.

34. The reconfigurable helicopter flight control system according to claim 33, wherein the computing means and the quasi-swashplate collective position computing means together comprise a first swashplate-actuator-failure control matrix computing means, a second swashplate-actuator-failure control matrix computing means, and a third swashplate-actuator-failure control matrix computing means.

* * * * *